US012772108B2

(12) United States Patent
Qu et al.

(10) Patent No.: US 12,772,108 B2
(45) **Date of Patent: *Oct. 20, 2026**

(54) KALMAN FILTER BASED PHASE-LOCKED LOOP FOR PHASE-SHIFT KEYING OR QUADRATURE AMPLITUDE MODULATED SIGNALS

(71) Applicant: Silicon Laboratories Inc., Austin, TX (US)

(72) Inventors: Xushuai Qu, Austin, TX (US); Guner Arslan, Austin, TX (US); Robert Gorday, Gainesville, FL (US); Yan Zhou, Spicewood, TX (US); Yi Shen Yeh, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 18/243,222

(22) Filed: Sep. 7, 2023

(65) Prior Publication Data

US 2025/0088901 A1 Mar. 13, 2025

(51) Int. Cl.
*H04W 28/04* (2009.01)
*H04L 7/033* (2006.01)

(52) U.S. Cl.
CPC ............ *H04W 28/04* (2013.01); *H04L 7/033* (2013.01)

(58) Field of Classification Search
CPC ...... H04W 28/04; H04L 7/033; H04L 7/0334; H04L 2027/003; H04L 2027/227; H04L 2027/0067; H04L 2027/0055; H04L 2027/0069
See application file for complete search history.

(56) References Cited

U.S. PATENT DOCUMENTS 5,285,480 A 2/1994 Chennakeshu
5,353,307 A 10/1994 Lester et al.
(Continued)

FOREIGN PATENT DOCUMENTS

WO WO-2018114325 A1 * 6/2018 .......... H04L 1/0071

OTHER PUBLICATIONS

Cao, X., et al., "Simplified LLR Algorithm For M-QAM Demodulation," The Journal of Engineering, Oct. 9, 2019, vol. 2019, Issue 21, pp. 7370-7375.
(Continued)

*Primary Examiner* — Jamal Javaid
(74) *Attorney, Agent, or Firm* — Zagorin Cave LLP

(57) ABSTRACT

A technique for reducing or eliminating effects of frequency and phase offset in a communications system includes implementing a demodulator having a Kalman filter based phase-locked loop for phase-shift keying or quadrature amplitude modulated signals. In an acquisition mode of operation, the Kalman filter based phase-locked loop continuously updates an error correction signal until an error between a received version of a predetermined signal transmitted using phase-shift keying or quadrature amplitude modulation and the predetermined signal is at or near zero. In a tracking mode of operation, the Kalman filter based phase-locked loop adjusts the error correction signal to maintain the error between the received signal and a predicted signal at or near zero.

20 Claims, 7 Drawing Sheets

(56) References Cited

U.S. PATENT DOCUMENTS

| | | | | |
|---|---|---|---|---|
| 5,751,776 | A * | 5/1998 | Shiino ................. | H04L 27/2273 375/371 |
| 6,314,147 | B1 | 11/2001 | Liang et al. | |
| 7,630,462 | B1 | 12/2009 | Lou | |
| 12,483,380 | B2 | 11/2025 | Qu et al. | |
| 2003/0053564 | A1 | 3/2003 | Kim | |
| 2005/0286622 | A1 | 12/2005 | Kim et al. | |
| 2007/0041434 | A1 | 2/2007 | Park | |
| 2012/0134398 | A1* | 5/2012 | Gamage .............. | H04L 27/2666 375/224 |
| 2016/0380759 | A1* | 12/2016 | Kondo .................... | H03L 7/091 375/376 |
| 2025/0088345 | A1 | 3/2025 | Qu et al. | |

OTHER PUBLICATIONS

Massachusetts Institute of Technology, "Introduction to EECS II Digital Communications Systems," 6.02 Lecture 7, Fall 2012, downloaded Nov. 16, 2023, 20 pages.

Massachusetts Institute of Technology, "Viterbi Decoding of Convolutional Codes," 6.02 Lecture 9, Mar. 8, 2010, 9 pages.

Mueller, K., and Müller, M., Timing Recovery in Digital Synchronous Data Receivers, IEEE Transactions on Communications, vol. Com-24, No. 5, May 1976, pp. 516-531.

Rice, M., "Digital Communications: A Discrete-Time Approach," Jan. 1, 2009, Chapter 8, Sections 8.4 and 8.5, pp. 459-497, Pearson Prentice Hall, Upper Saddle River, USA.

Patapoutian, A., "Phase-Locked Loops and Kalman Filters," IEEE Transactions on Communications, vol. 47, No. 5, May 1999, 3 pages.

Bluetooth®, "Low Energy Controller," Specification of the Bluetooth® System, vol. 6, Covered Core Package Version: 5.4, Version Date Jan. 31, 2023, 437 pages.

U.S. Appl. No. 19/371,380, filed Oct. 28, 2025, entitled "Kalman Filter Based Phase-Locked Loop with Re-Encoding Based Phase Detector," by inventors Qu et al.

U.S. Appl. No. 19/062,587, filed Feb. 25, 2025, entitled "Integrated Kalman Filter-Based Phase-Locked Loop and Viterbi Equalizer," by inventors Qu and Arslan.

U.S. Appl. No. 19/214,301, filed May 21, 2025, entitled "Demodulator Including Pipelined Kalman Filter Phase Tracking," by inventors Li et al.

U.S. Appl. No. 19/250,442, filed Jun. 26, 2025, entitled "Symbol Spaced Timing Recovery Loop with Re-Encoded Decision Symbols," by inventors Qu and Arslan.

U.S. Appl. No. 19/304,251, filed Aug. 19, 2025, entitled "Kalman Filter Based Phase-Locked Loop Recovery Scheme," by inventors Qu and Arslan.

* cited by examiner

KALMAN FILTER BASED PHASE-LOCKED LOOP FOR PHASE-SHIFT KEYING OR QUADRATURE AMPLITUDE MODULATED SIGNALS

BACKGROUND

Field of the Invention

This disclosure relates to communications systems in general, and more particularly to radio frequency (RF) communications systems with frequency and phase offset estimation and compensation.

Description of the Related Art

In a typical wireless communications system, coherent reception requires that the frequency and phase of a local oscillator at a receiving wireless communications device be identical to the frequency and phase of the carrier wave generated at the transmitting wireless communications device. That is, the difference in phase (i.e., phase offset) and difference in frequency (i.e., frequency offset) between the local oscillator of the receiver and the carrier wave generated using a remote oscillator at a transmitter, should be zero. Noise or any frequency offset or frequency drift between the local oscillator of the receiving wireless communications device and a frequency of a remote oscillator of a transmitting wireless communications device can introduce error into recovered data or measurements (e.g., High Accuracy Distance Measurements) based on the received signal. Accordingly, techniques that reduce or eliminate effects of frequency or phase offset at a receiving wireless communications device are desired.

SUMMARY OF EMBODIMENTS OF THE INVENTION

In at least one embodiment, a method for tracking frequency and phase offset in a receiver includes providing a baseband version of a received radio frequency signal and computing an error signal based on the baseband version of the received radio frequency signal and an expected transmitted data signal. The method includes generating an error correction signal based on a phase of the error signal and a predicted instantaneous phase signal. The method includes providing a corrected baseband version of the received radio frequency signal based on the baseband version of the received radio frequency signal and the error correction signal. In a training mode of operation of the receiver, the expected transmitted data signal may include predetermined samples of an Access Address field of a Bluetooth© Low Energy packet.

In at least one embodiment, a wireless communications device includes a receiver front-end circuit configured to provide a baseband version of a received radio frequency signal. The wireless communications device includes a demodulator having a phase detector configured to provide an error signal generated based on the baseband version of the received radio frequency signal and an expected transmitted data signal. The demodulator includes a phase-locked loop configured to generate an error correction signal based on a phase of the error signal and a predicted instantaneous phase of the error signal. The demodulator includes a correction circuit configured to provide a corrected baseband version of the received radio frequency signal based on the baseband version of the received radio frequency signal and the error correction signal.

In at least one embodiment, a method for recovering data transmitted using a radio frequency signal includes training a Kalman filter based phase-locked loop using an Access Address field of a Bluetooth Low Energy packet of a received signal in a first mode of operating a receiver. The method includes tracking a frequency and phase offset of the received signal using the Kalman filter based phase-locked loop in a second mode of operating the receiver. The method includes correcting the received signal using an estimate of the frequency and phase offset generated by the Kalman filter based phase-locked loop.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A technique for reducing or eliminating effects of frequency and phase offset in a communications system includes implementing a demodulator having a Kalman filter based phase-locked loop for reducing or eliminating frequency and phase offset in received phase-shift keying or quadrature amplitude modulated signals. In an acquisition mode of operation, the Kalman filter based phase-locked loop continuously updates an error correction signal until an error between a received version of a predetermined signal transmitted using phase-shift keying or quadrature amplitude modulation and the predetermined signal is at or near zero. In a tracking mode of operation, the Kalman filter based phase-locked loop adjusts the error correction signal to maintain the error between the received signal and a predicted signal at or near zero.

Figure 1:
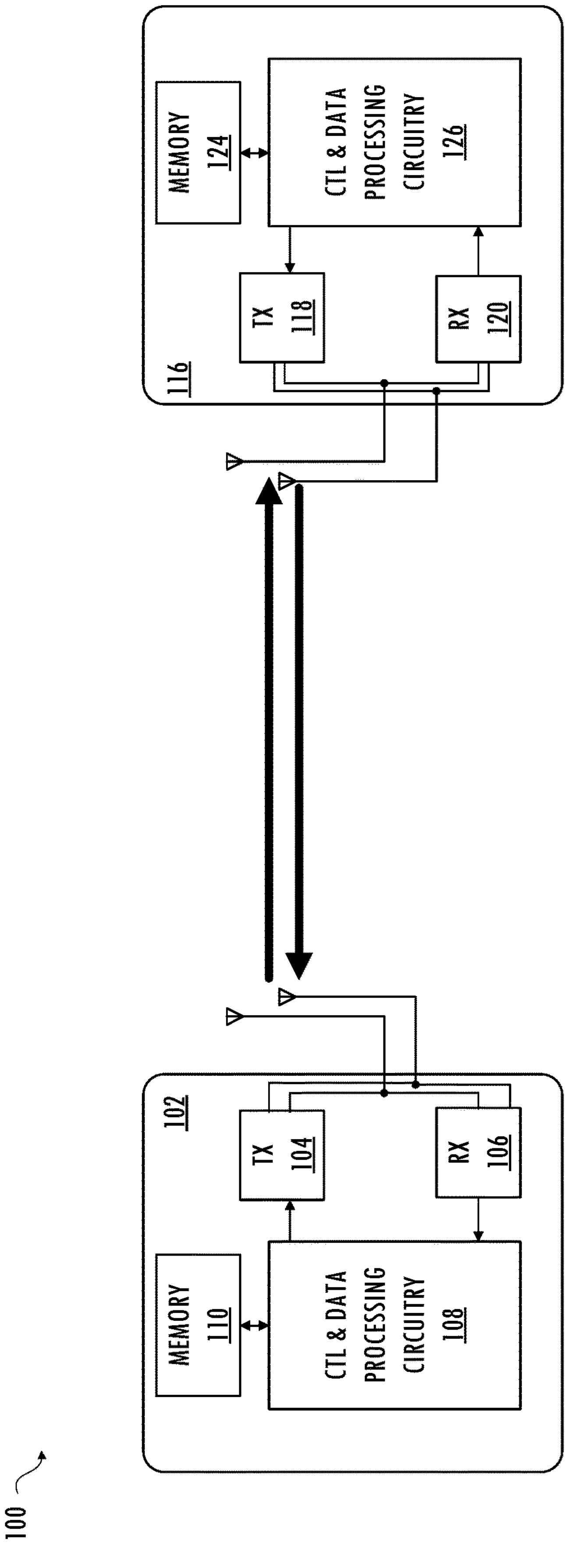
FIG. 1 illustrates a functional block diagram of an exemplary wireless communications system.

Referring to FIG. 1, in at least one embodiment, wireless communications system 100 includes wireless communications device 102 and wireless communications device 116, which are devices compliant with the Bluetooth® Low Energy (BLE) communications protocol or BLE High Data Throughput (BLE HDT) communications protocol designed for low power and low latency applications. Wireless communications device 102 includes transmitter 104, receiver 106, control & data processing circuitry 108, and memory 110. Wireless communications device 116 includes transmitter 118, receiver 120, control & data processing circuitry 126, and memory 124. Although wireless communications device 102 and wireless communications device 116 are illustrated as each including only one transmitter, one receiver, and two antennas, in other embodiments of wireless communications system 100, wireless communications device 102 or wireless communications device 116 includes multiple transmitters, multiple receivers, additional antennas, or a single antenna with internal circuitry selection or radio frequency switches. Wireless communications system 100 can communicate information using a predetermined wireless communications protocol, e.g., data using BLE communications protocol or BLE HDT communications protocol. However, in other embodiments, wireless communications system 100 can transmit and receive data compliant with other wireless communications protocols.

Figure 2:
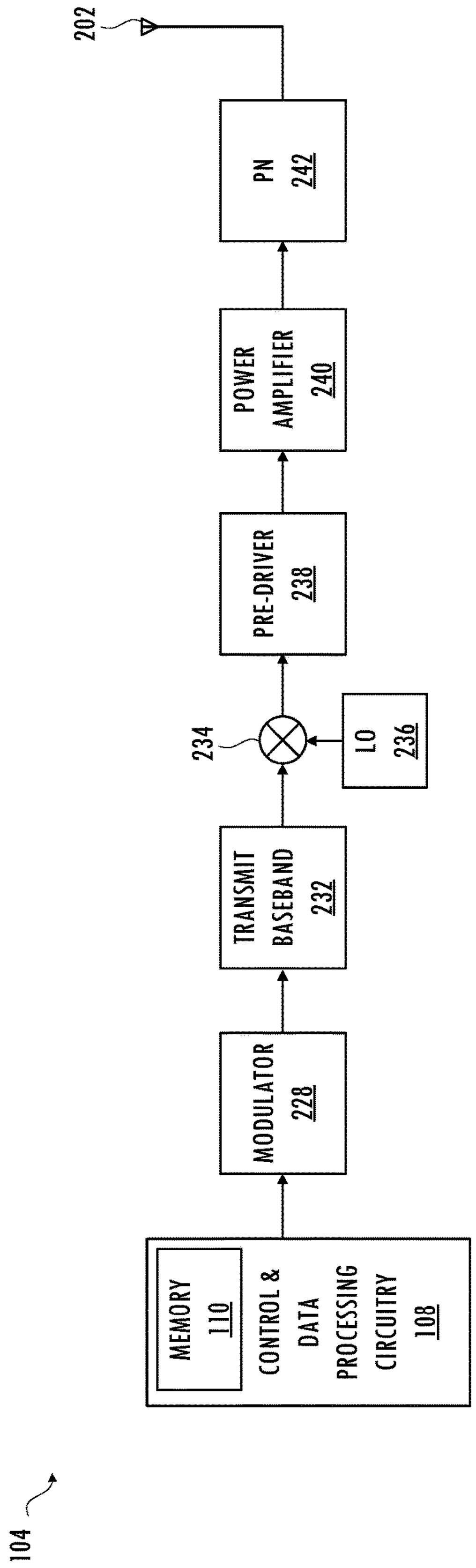
FIG. 2 illustrates a functional block diagram of the exemplary wireless communications transmitter of FIG. 1.

FIG. 2 illustrates an exemplary embodiment of transmitter 104 that may be included in a physical radio of wireless communications device 102 or wireless communications device 116 of FIG. 1. Control & data processing circuitry 108 of FIG. 2 may perform a variety of functions (e.g., logic, arithmetic, etc.). For example, data processing circuitry 108 executes a program, routine, or algorithm (whether in software, firmware, hardware, or a combination thereof) that performs desired control or data processing tasks consistent with a physical layer of a communications protocol and provides data to modulator 228. Modulator 228 applies a predetermined modulation scheme (e.g., phase-shift keying or quadrature amplitude modulation) to data for transmission and provides modulated data to transmit baseband circuit 232, which in an embodiment includes a digital-to-analog converter and analog programmable gain filters. Transmit baseband circuit 232 provides the baseband (or intermediate frequency (IF)) signal to frequency mixer 234, which performs frequency translation or shifting of the baseband signal using a reference or local oscillator (LO) signal provided by local oscillator 236. In at least one operational mode of transmitter 104, frequency mixer 234 translates the baseband signal centered at DC to a 2.4 GHz frequency band. Pre-driver 238 amplifies the signal generated by frequency mixer 234 to a level sufficient for power amplifier 240. Power amplifier 240 further amplifies the signal to provide a higher power signal sufficient to drive passive network 242 and antenna 202. Passive network 242 provides impedance matching, filtering, and electrostatic discharge protection.

Figure 3:
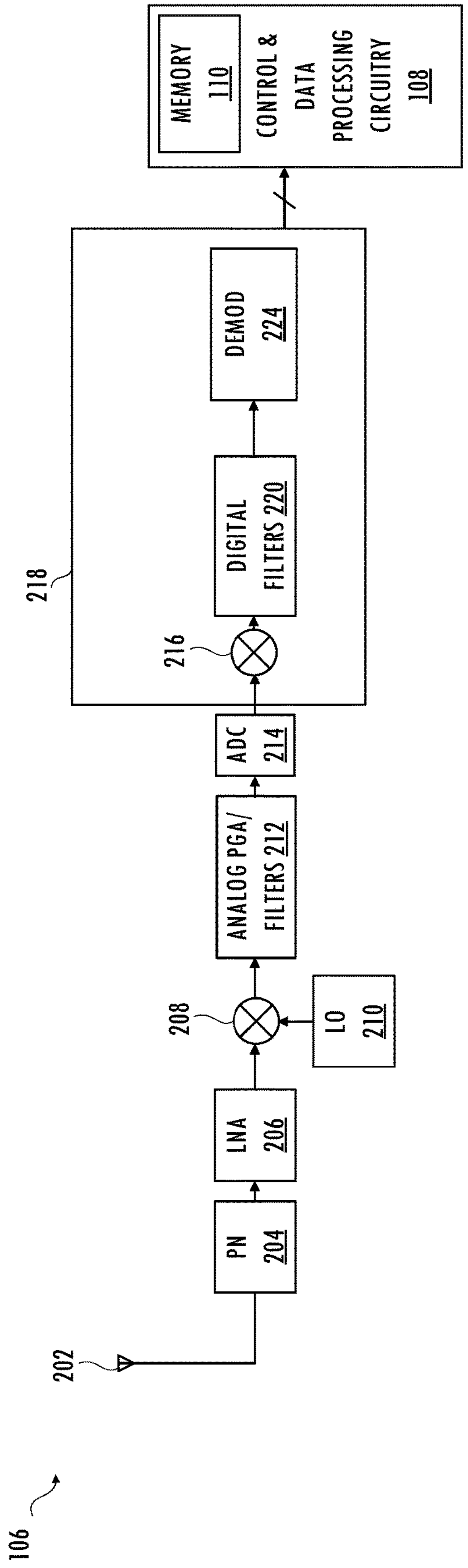
FIG. 3 illustrates a functional block diagram of the exemplary wireless communications receiver of FIG. 1.

FIG. 3 illustrates an exemplary embodiment of receiver 106 that may be included in a radio of the wireless communications devices described above. Antenna 202 provides a radio frequency (RF) signal to passive network 204, which provides impedance matching, filtering, and electrostatic discharge protection. Passive network 204 is coupled to low-noise amplifier 206, which amplifies the RF signal without substantial degradation to the signal-to-noise ratio and provides the amplified RF signal to frequency mixer 208. Frequency mixer 208 performs frequency translation or shifting of the RF signal using a reference or local oscillator signal provided by local oscillator 210. For example, in at least one operational mode of receiver 106, frequency mixer 208 translates the RF signal from a 2.4 GHz frequency band to baseband frequencies centered at DC (i.e., zero-intermediate frequency (ZIF) in a ZIF mode of operation). In another operational mode, receiver 106 is configured as a low-intermediate frequency (LIF) receiver (i.e., in a LIF mode of operation) and frequency mixer 208 translates the RF signal to a low-intermediate frequency (e.g., 100-200 kHz) to reduce or eliminate DC offset and 1/f noise problems of ZIF receivers.

Frequency mixer 208 provides the translated output signal as a set of two signals, an in-phase (I) signal and a quadrature (Q) signal. The I and Q signals are analog time-domain signals. In at least one embodiment of receiver 106, the analog programmable gain amplifier and filters 212 provide amplified and filtered versions of the I and Q signals to analog-to-digital converter (ADC) 214, which converts those versions of the I and Q signals to digital I and Q signals (i.e., I and Q samples). Exemplary embodiments of ADC 214 use a variety of signal conversion techniques (e.g., delta-sigma (i.e., sigma-delta) analog-to-digital conversion). ADC 214 provides the digital I and Q signals to signal processing circuitry 218. In general, signal processing circuitry 218 performs digital signal processing (e.g., frequency translation (e.g., using digital mixer 216), filtering (e.g., using digital filters 220), demodulation, or signal correction) of the digital I and Q signals. In at least one embodiment, signal processing circuitry 218 includes demodulator 224, which recovers or extracts information from digital I and Q signals (e.g., data signals, that were modulated using phase-shift keying or quadrature amplitude modulation by modulator 228 of transmitter 104 of FIG. 2 and provided to antenna 202 as RF signals).

Referring back to FIG. 3, control & data processing circuitry 108 may perform a variety of functions (e.g., logic, arithmetic, etc.). For example, control & data processing circuitry 108 may use the demodulated data in a program, routine, or algorithm (whether in software, firmware, hardware, or a combination thereof) to perform desired control or data processing tasks. In at least one embodiment, control & data processing circuitry 108, which includes memory 110, controls other circuitry, sub-system, or systems (not shown). In an embodiment, control & data processing circuitry 108 implements a data link layer that includes a state machine, defines state transitions, defines packet formats, performs scheduling, performs radio control, and provides link-layer decryption consistent with at least one wireless communications protocol. Transmitter 104 of FIG. 2 and receiver 106 of FIG. 3 are illustrative only and may vary with the communications protocol implemented by wireless communications system 100 of FIG. 1.

Figure 4:
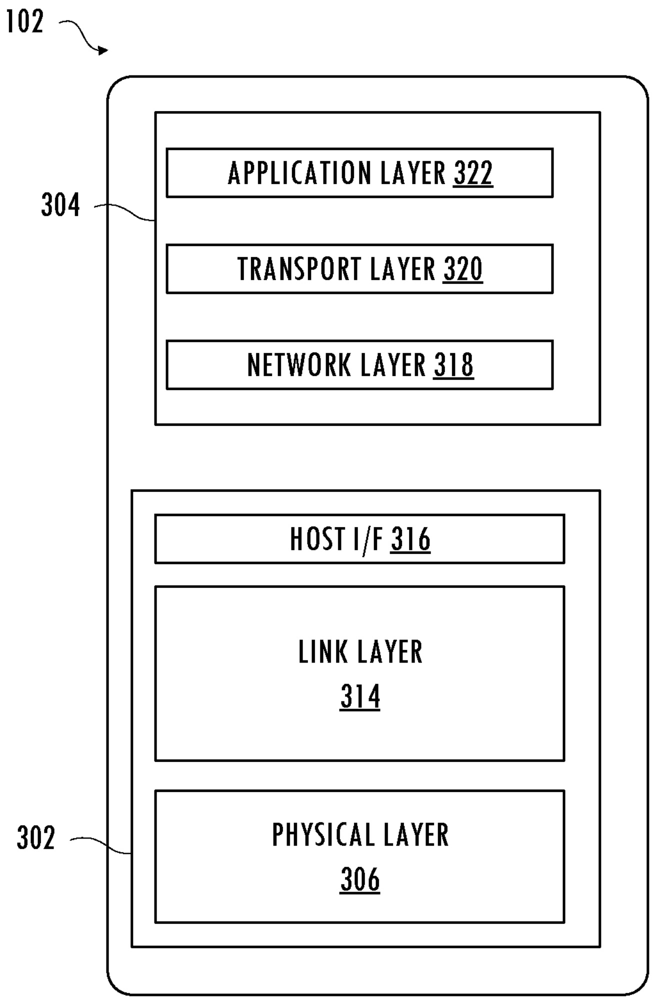
FIG. 4 illustrates a functional block diagram of a protocol stack executing on the exemplary wireless communications device of FIG. 1.

Referring to FIGS. 1 and 4, in an embodiment, wireless communications device 102 includes separate integrated circuits for implementing functions of control & data processing circuitry 108, e.g., controller 302 and host 304. In some embodiments, wireless communications device 102 incorporates functionality of controller 302 and host 304 in a single integrated circuit device. Controller 302 and host 304 execute instructions to implement portions of a wireless communications network protocol stack. For example, controller 302 implements physical layer 306, which includes software that interacts with the RF transceiver (e.g., including the transmitter and receiver described above). Link layer 314 interfaces directly to physical layer 306 to handle transmission and reception of associated signals. In at least one embodiment, link layer 314 of controller 302 communicates with host 304 via host interface 316. Host 304 implements upper layers of the communications protocol stack (e.g., network layer 318, transport layer 320, and application layer 322). In other embodiments, the layers of the software protocol stack have different distributions between controller 302 and host 304 or are completely implemented using controller 302.

Figure 5:
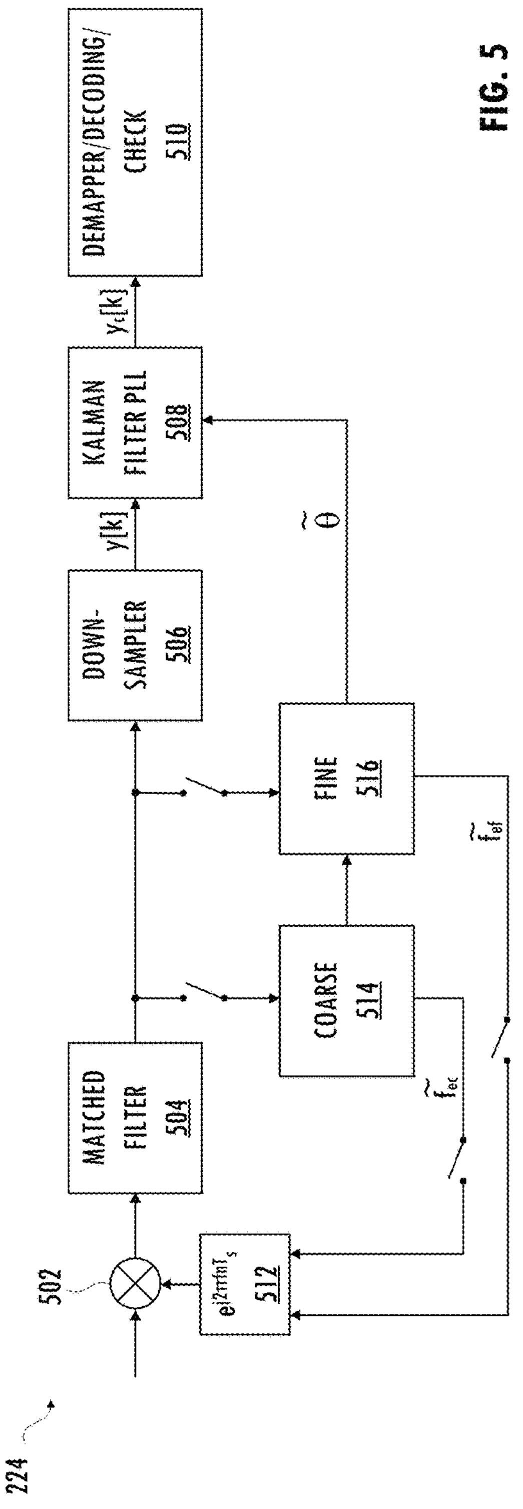
FIG. 5 illustrates a functional block diagram of a demodulator including a Kalman filter based phase-locked loop for phase-shift keying or quadrature amplitude modulated signals consistent with at least one embodiment of the invention.

Referring to FIGS. 3 and 5, in at least one embodiment, demodulator 224 receives a digital intermediate frequency signal and mixer 502 frequency shifts the signal to baseband (e.g., ZIF) using a reference signal. Under ideal conditions, the baseband signal provided by mixer 502 is perfectly centered around DC. However, mismatch between the remote oscillator on the transmitting wireless communications device and the local oscillator of the receiving wireless communications device causes a frequency or phase offset in the baseband signal. Matched filter 504 increases the signal-to-noise ratio of the received signal, but introduces a delay. During a first phase of receiver processing (e.g., during a short training sequence of an Orthogonal Frequency Division Multiplexing (OFDM) preamble sequence, i.e., $n<n_{STS}$), coarse timing detection and frequency estimation 514 generates a coarse frequency correction $\widetilde{f_{ec}}$ to reduce the frequency offset. During a second phase of receiver processing (e.g., during a long training sequence of the OFDM preamble sequence, i.e., $n_{STS}<n\leq n_{LTS}$), fine timing detection and frequency and phase estimation 516 generates fine frequency error correction $\widetilde{f_{ef}}$ and initial phase estimation $\tilde{\theta}$ to further reduce the frequency or phase offset. Mixer 502 digitally mixes the received signal with a reference signal (e.g., a tone having a programmable frequency) generated by signal generator 512. Prior to detecting the short training sequence (i.e., $n<n_{STS}$), signal generator 512 is programmed to generate an intermediate frequency tone having frequency $f_{if}$, which is used to down convert the received signal to baseband or DC using mixer 502. After detecting the short training sequence, but before detecting the long training sequence (i.e., $n_{STS}<n\leq n_{LTS}$), signal generator 512 is programmed to a coarsely corrected value having frequency $f_{if}+\widetilde{f_{ec}}$ to further down-convert the received signal and compensate for frequency offset. After detecting the long training sequence (i.e., $n>n_{LTS}$), signal generator 512 is programmed to a finely corrected value having frequency $f_{if}+\widetilde{f_{ec}}+\widetilde{f_{ef}}$. Signal generator 512 adjusts the reference signal by initial phase estimation $\tilde{\theta}$, coarse frequency correction $\widetilde{f_{ec}}$, or fine frequency correction $\widetilde{f_{ef}}$ and thus, mixer 502 applies error correction to the received signal. Downsampler 506 generates received signal y[n], which is a version of the received signal that is downsampled from a sample space to a symbol space. Kalman filter based phase-locked loop 508, described in detail below, applies initial phase estimation $\tilde{\theta}$ to the received signal and corrects any residual phase error in corrected received signal $y_c[n]$, which is a phase-corrected version of received signal y[n]. Demapper/decoding/check circuit 510 recovers transmitted data from corrected received signal $y_c[n]$ using demapping, decoding, and error correction techniques.

Figure 6A:
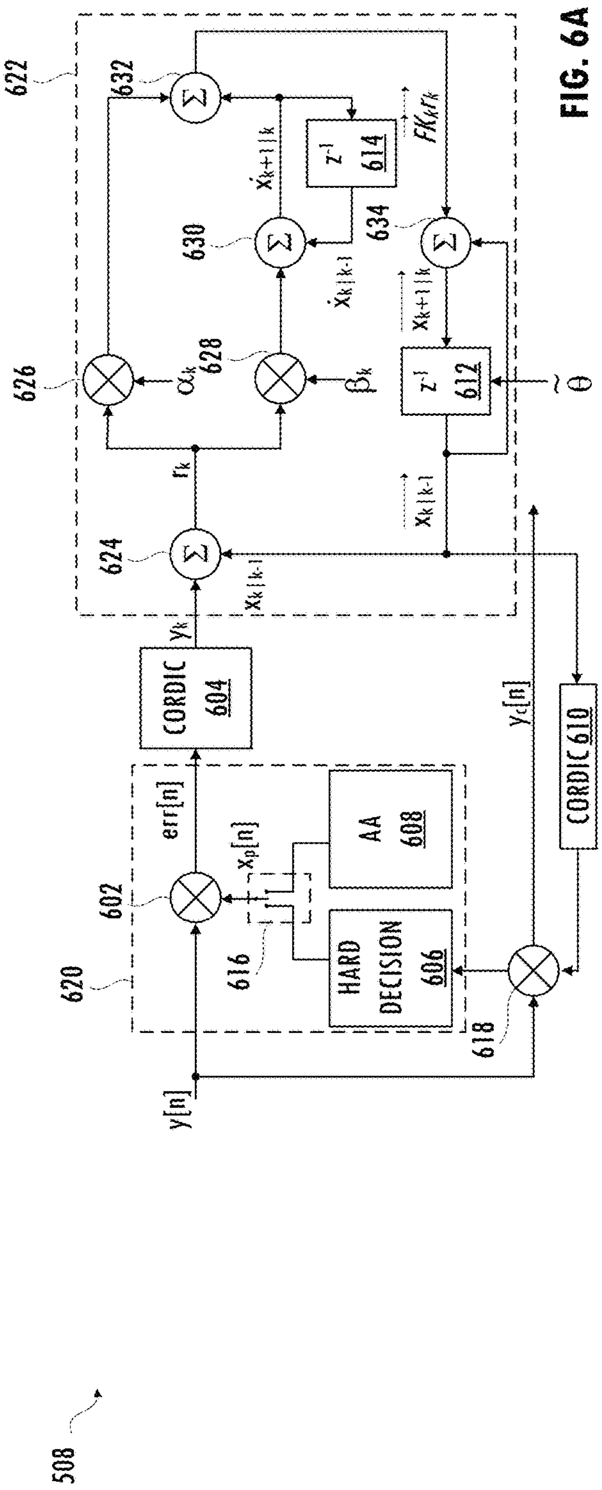
FIGS. 6A and 6B illustrate functional block diagrams of a Kalman filter based phase-locked loop for receiving phase-shift keying or quadrature amplitude modulated signals consistent with embodiments of the invention.

Referring to FIG. 6A, in at least one embodiment, Kalman filter based phase-locked loop 508 includes phase detector 620 and Kalman filter 622. In at least one embodiment, phase detector 620 multiplies received signal y[n] by a complex conjugate of an expected received signal to generate error signal err[n]. In at least one embodiment, phase detector 620 includes switch 616, which selectively provides a predetermined signal based on the Access Address field of a BLE packet as expected signal $x_p[n]$ to multiplier 602 according to sample index n. For example, if $n\leq n_{AAEND}$, then switch 616 provides a corresponding output of access address storage 608, e.g., samples of the predetermined Access Address (in Cartesian coordinates, i.e., real and imaginary values corresponding to the in-phase and quadrature values) as the expected signal. If $n>n_{AAEND}$, then switch 616 provides the output of hard decision circuit 606 as expected signal $x_p[n]$. In general, all BLE packets include the Access Address to identify communications on a physical channel, and to exclude or ignore packets on different physical channels that are using the same physical interface channels in physical proximity. The Access Address determines whether the packet is directed to an advertising physical channel (and thus an advertising physical link) used for non-periodic advertising, to the periodic physical channel used for periodic advertising, or to a piconet physical channel (and thus an active physical link to a device). The BLE advertising physical channel used for non-periodic advertising uses a fixed Access Address. The BLE periodic physical channel used for periodic advertising and BLE piconet physical channels use a randomly generated 32-bit value as their Access Address.

In at least one embodiment, hard decision circuit 606 compares a corrected version of the received signal to predetermined modulated values and provides the nearest predetermined modulated value (in Cartesian coordinates, i.e., real and imaginary values corresponding to the in-phase and quadrature values) as expected signal $x_p[n]$. In general, hard decision circuit 606 performs binary quantization of a demodulated signal, e.g., quantizes to Q>2 levels.

In at least one embodiment, CORDIC 604 converts error signal err[n] from Cartesian coordinates to polar coordinates using a COordinate Rotation DIgital Computer (CORDIC), which may be dedicated to a phase measurement implementation or shared with other operations of the receiver. In general, a CORDIC implements known techniques to perform calculations, including trigonometric functions (e.g., an arctangent function) and complex multiplies, without using a multiplier. The only operations the CORDIC uses are addition, subtraction, bit-shift, and table-lookup operations to implement the arctangent function. In other embodiments, a digital signal processor executing firmware or an arctangent circuit is used to convert error signal err[n] from Cartesian coordinates to polar coordinates.

CORDIC 604 provides phase $y_k$, as the input to Kalman filter 622. Kalman filter 622 determines residual phase error signal $r_k$ by computing the difference between phase $y_k$ and predicted instantaneous phase $x_{k|k-1}$. Phase difference circuit 624 provides residual phase error signal $r_k$ to a proportional integral time-invariant controller including a proportional path (represented by gain circuit 626) and an integral path (represented by gain circuit 628, accumulator 630, and register 614). Summing circuit 632 combines the outputs of the proportional path and the integral path and provides a predicted frequency signal to an integrator represented by accumulator 634 and register 612. The integrator provides the predicted instantaneous phase signal to phase difference circuit 624 and to CORDIC 610, which converts the predicted instantaneous phase signal from polar coordinates to Cartesian coordinates for use as an error correction signal to be combined with received signal y[n] by correction circuit 618 to generate corrected received signal $y_c[n]$.

In an embodiment, Kalman filter based phase-locked loop 508 can be modeled by defining a state $$\vec{x_k} = \begin{bmatrix} x_k \\ \dot{x}_k \end{bmatrix},$$

where $x_k$ is instantaneous phase and $\dot{x}_k$ is frequency. The state transition model is $$\overrightarrow{x_{k+1}} = \vec{F}\vec{x_k} + \vec{W_k} = \begin{bmatrix} 1 & 1 \\ 0 & 1 \end{bmatrix}\begin{bmatrix} x_k \\ \dot{x}_k \end{bmatrix} + \begin{bmatrix} w_k \\ \dot{w}_k \end{bmatrix}.$$

The observation model is $$y_k = \vec{H}\vec{x_k} + v_k = [\,1 \;\; 0\,]\begin{bmatrix} x_k \\ \dot{x}_k \end{bmatrix} + v_k = x_k + v_k.$$

The prediction model is $$\overrightarrow{x_{(k|k-1)}} = \begin{bmatrix} x_{(k|k-1)} \\ \dot{x}_{(k|k-1)} \end{bmatrix};$$

$$\overrightarrow{x_{(k-1|k)}} = \vec{F}\overrightarrow{x_{(k|k-1)}} + \vec{F}\vec{K_k}r_k,$$

where $\vec{F}$ is the state transition matrix, $\vec{H}$ is the observation matrix, $V_k$ is the phase variance, $\vec{K_k}$ is the loop gain vector $$\begin{bmatrix} \alpha_k \\ \beta_k \end{bmatrix},$$

$r_k$ is the error that drives or controls the prediction, and $$r_k = y_k + \overrightarrow{HX_{(k|k-1)}}.$$

Register 612 is initialized with initial phase estimation θ, which is provided by fine timing detection and frequency and phase estimation 516.

For an exemplary received signal y[n]=e^(j(θ_m+2πf_OS n+θ_u), where $\theta_m$ is the modulated phase for phase-shift keying, $f_{OS}$ is the frequency offset between the remote oscillator of the transmitter and the local oscillator of the receiver, and $\theta_u$ is a random phase offset, the following table illustrates exemplary values in FIG. 6A, where the first two symbols (n=1 and n=2) correspond to predetermined Access Address values and the following three symbols (n=3, 4, 5) correspond to data symbols.

| y[n] | $x_p[n]$ | err[n] | $y_k$ | $x_{k\|k-1}$ | $y_c[n]$ |
|---|---|---|---|---|---|
| $e^{j\frac{\pi}{4}+2\pi 10^3(1)+\frac{\pi}{5}}$ | $e^{j\frac{\pi}{4}}$ | $e^{j\left(2\pi 10^3(1)+\frac{\pi}{5}\right)}$ | $2\pi 10^3(1)+\frac{\pi}{5}$ | $2\pi 10^3(1)+\frac{\pi}{5}+\frac{\pi}{100}$ | NA (AA) |
| $e^{j\frac{3\pi}{4}+2\pi 10^3(2)+\frac{\pi}{5}}$ | $e^{j\frac{3\pi}{4}}$ | $e^{j\left(2\pi 10^3(2)+\frac{\pi}{5}\right)}$ | $2\pi 10^3(2)+\frac{\pi}{5}$ | $2\pi 10^3(2)+\frac{\pi}{5}+\frac{\pi}{100}-\frac{\pi}{150}$ | NA (AA) |
| $e^{-j\frac{\pi}{4}+2\pi 10^3(3)+\frac{\pi}{5}}$ | $e^{-j\frac{\pi}{4}}$ | $e^{j\left(2\pi 10^3(3)+\frac{\pi}{5}\right)}$ | $2\pi 10^3(3)+\frac{\pi}{5}$ | $2\pi 10^3(3)+\frac{\pi}{5}-\frac{\pi}{150}$ | $e^{-j\frac{\pi}{4}-\frac{\pi}{150}}$ |
| $e^{-j\frac{\pi}{4}+2\pi 10^3(4)+\frac{\pi}{5}}$ | $e^{-j\frac{\pi}{4}}$ | $e^{j\left(2\pi 10^3(4)+\frac{\pi}{5}\right)}$ | $2\pi 10^3(4)+\frac{\pi}{5}$ | $2\pi 10^3(4)+\frac{\pi}{5}-\frac{\pi}{120}$ | $e^{-j\frac{\pi}{4}-\frac{\pi}{120}}$ |
| $e^{-j3\frac{\pi}{4}+2\pi 10^3(5)+\frac{\pi}{5}}$ | $e^{-j\frac{3\pi}{4}}$ | $e^{j\left(2\pi 10^3(5)+\frac{\pi}{5}\right)}$ | $2\pi 10^3(5)+\frac{\pi}{5}$ | $2\pi 10^3(5)+\frac{\pi}{5}-\frac{\pi}{90}$ | $e^{-j\frac{3\pi}{4}-\frac{\pi}{90}}$ |

Figure 6B:
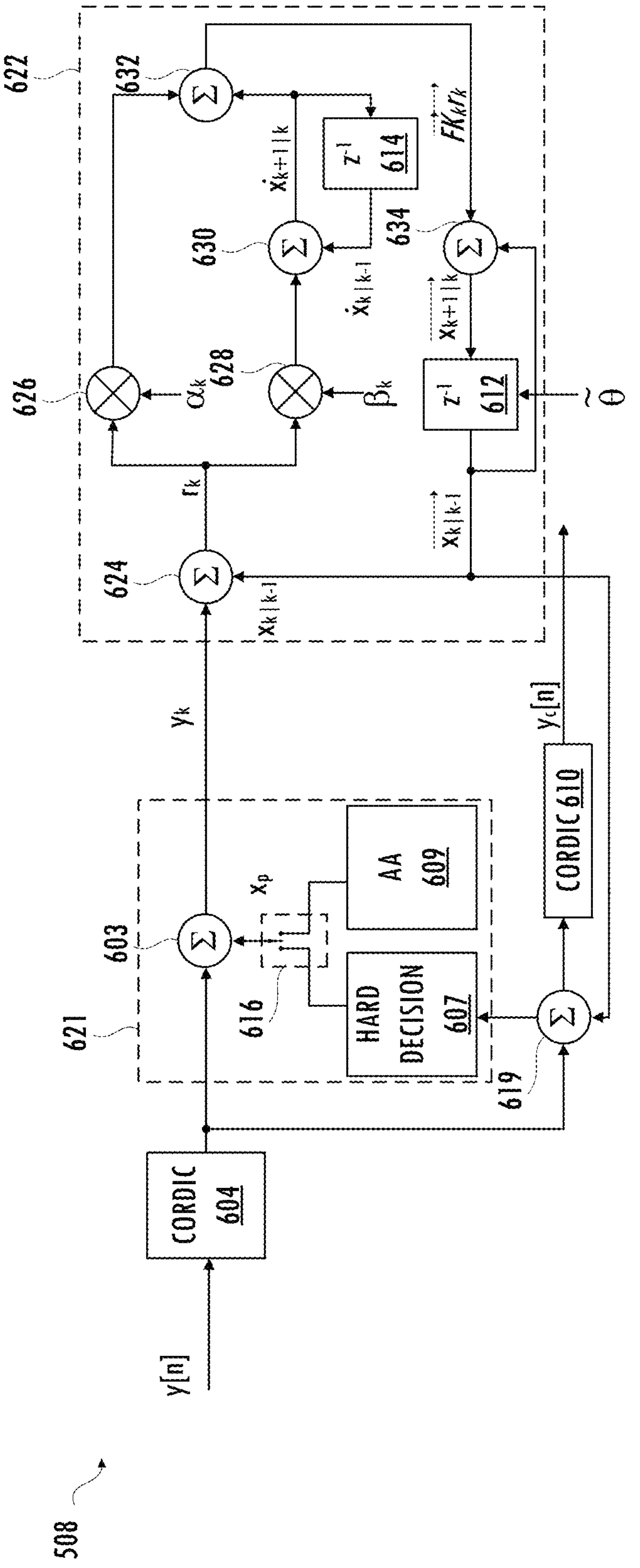

Referring to FIG. 6B, in other embodiments of Kalman filter based phase-locked loop 508, the conversions between Cartesian coordinates and polar coordinates are performed outside of the loop, thereby decreasing computational complexity of Kalman filter based phase-locked loop 508. CORDIC 604 and CORDIC 610 perform the conversions between Cartesian coordinates and polar coordinates outside of the loop and phase detector 621 performs subtraction using adder 603 and the loop performs addition using adder 619 to determine the phase error and perform correction, respectively, instead of performing complex multiplications, as required by the embodiment of FIG. 6A. Referring to FIG. 6B, CORDIC 604 converts received signal y[n] from Cartesian coordinates to polar coordinates and CORDIC 610 converts the corrected signal from polar coordinates to Cartesian coordinates to generate corrected received signal $y_c[n]$.

Figure 7:
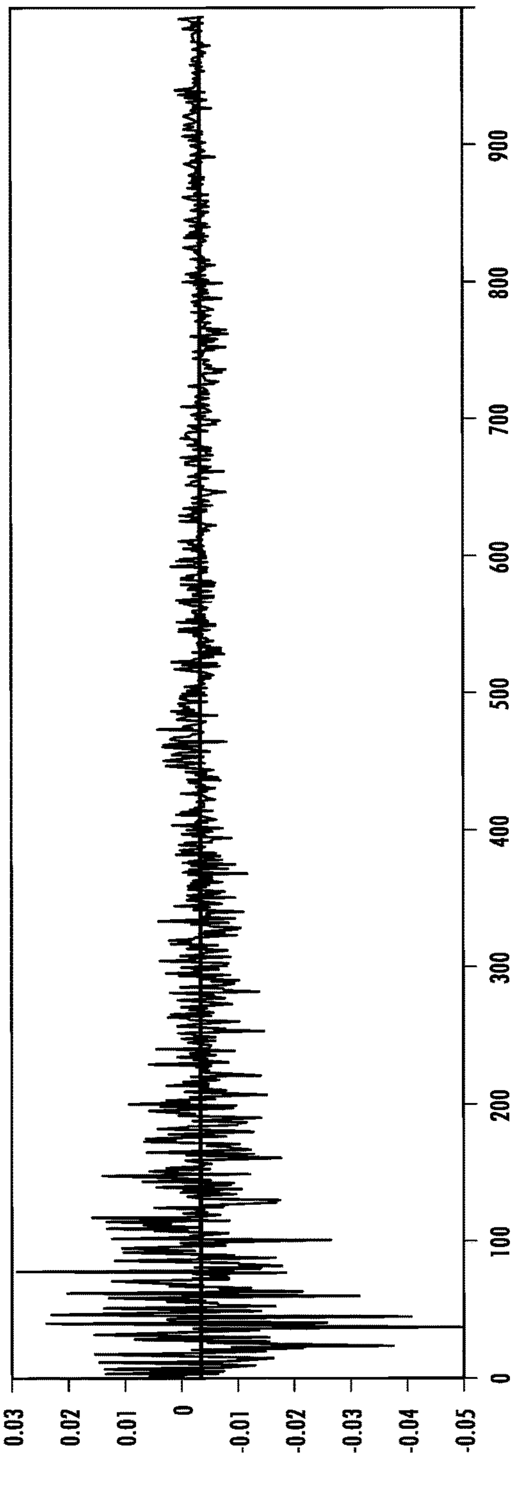
FIG. 7 illustrates a waveform of predicted frequency as a function of sample index at the output of the proportional integral controller of FIGS. 6A and 6B consistent with at least one embodiment of the invention.
Figure 8:
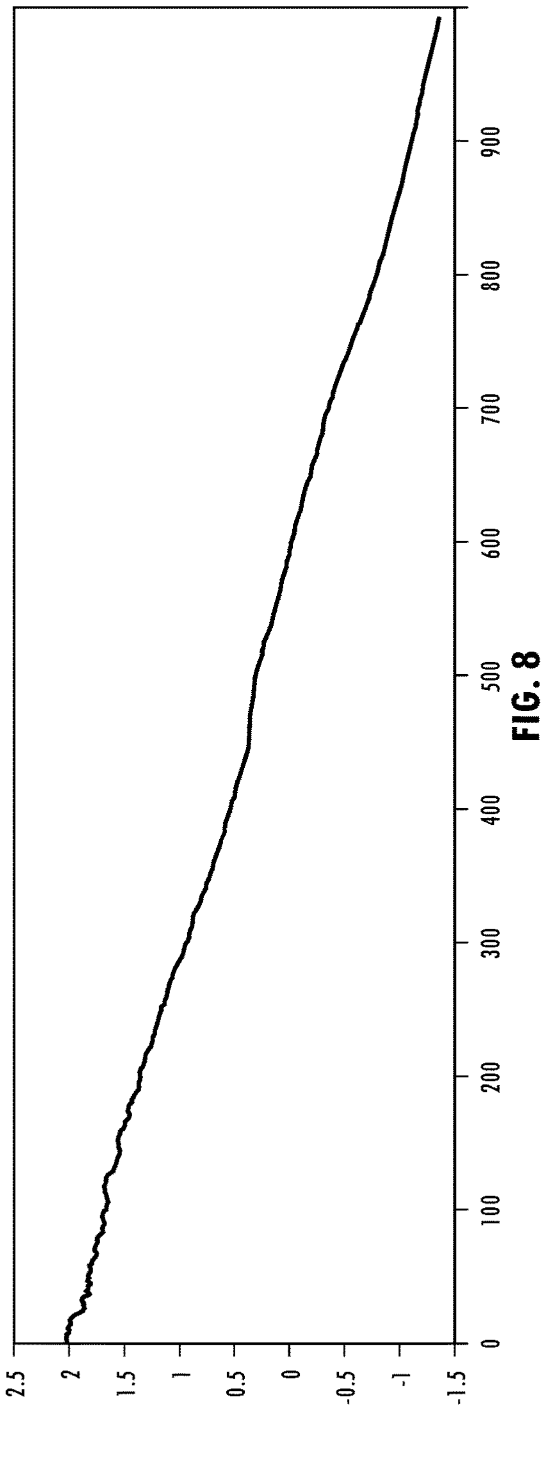
FIG. 8 illustrates a waveform of predicted instantaneous phase as a function of sample index of FIGS. 6A and 6B consistent with at least one embodiment of the invention.
Figure 10:
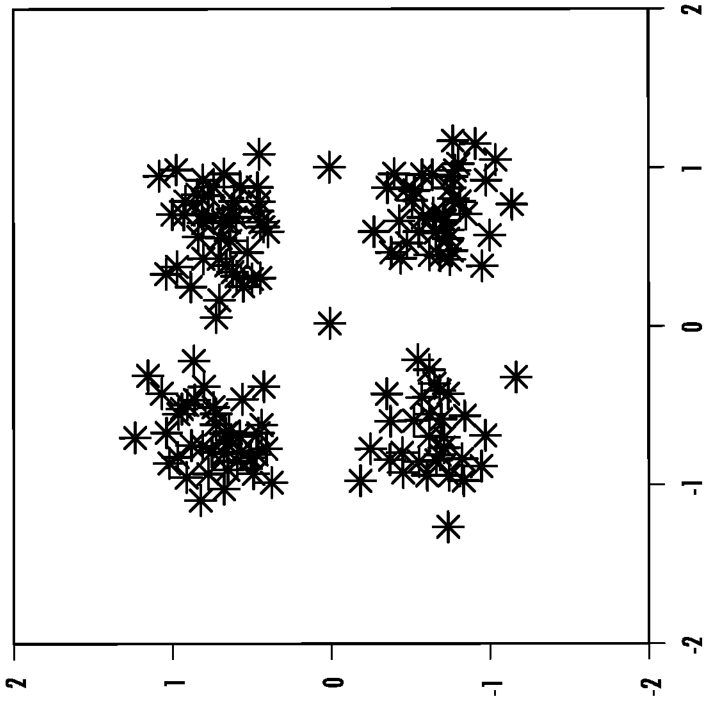
FIG. 10 illustrates a quadrature amplitude modulated constellation of data in the received signal after filtering by a Kalman filter based phase-locked loop consistent with at least one embodiment of the invention.
Figure 9:
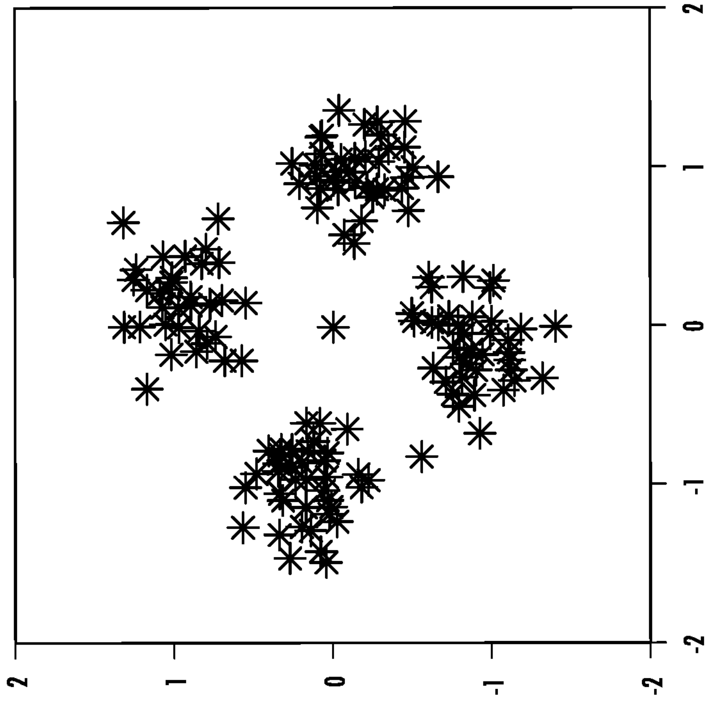
FIG. 9 illustrates a quadrature amplitude modulated constellation of data in a received signal before filtering by a Kalman filter based phase-locked loop consistent with at least one embodiment of the invention.

FIG. 7 illustrates an example of the predicted frequency signal at the output of summing circuit 632 of FIGS. 6A and 6B, where Kalman filter based phase-locked loop 508 maintains the predicted frequency of the residual signal at a negligible value after training of Kalman filter based phase-locked loop 508 to converge the predicted frequency of the residual signal to a negligible value as sample time increases. FIG. 8 illustrates an example of the predicted instantaneous phase signal $X_{k|k-1}$ at the output of the integrator represented by accumulator 634 and register 612 of FIGS. 6A and 6B where the predicted instantaneous phase signal has linear behavior as a function of sample time. FIG. 9 illustrates an example of received samples y[n] prior to Kalman filter based phase-locked loop 508 of FIGS. 5, 6A, and 6B. FIG. 10 illustrates an example of corrected received samples $y_c[n]$ output by Kalman filter based phase-locked loop 508 of FIGS. 5, 6A, and 6B where Kalman filter based phase-locked loop 508 reduces or eliminates rotation of the constellation caused by frequency and phase offset in the received signal. Thus, Kalman filter based phase-locked loop 508, which is a phase-locked loop having variable gain consistent with Kalman filter theory and has faster convergence than a conventional phase-locked loop with fixed gain, improves performance of a receiver in a wireless communications system (e.g., improves signal-to-noise ratio of the received signal and thus facilitates communications at increased information rates) in applications having data transmitted in bursts or packets, e.g., BLE HDT.

The description of the invention set forth herein is illustrative and is not intended to limit the scope of the invention as set forth in the following claims. For example, while the invention has been described in an embodiment in which phase-shift keying is used, one of skill in the art will appreciate that the teachings herein can be utilized with other modulation schemes. In another example, while the invention has been described in an embodiment in which an Access Address field of a BLE packet are used, any predetermined symbols of a communications packet (e.g., training symbols) may be used. In other embodiments, a soft decision circuit that can provide an improved reference signal in the tracking mode of operation is used instead of hard decision circuit 606.

The terms “first,” “second,” “third,” and so forth, as used in the claims, unless otherwise clear by context, distinguish between different items in the claims and do not otherwise indicate or imply any order in time, location, or quality. For example, “a first received signal,” and “a second received signal,” do not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for tracking frequency and phase offset in a receiver, the method comprising:

providing a baseband version of a received radio frequency signal;

computing an error signal based on the baseband version of the received radio frequency signal and an expected transmitted data signal;

generating an error correction signal based on a phase of the error signal and a predicted instantaneous phase signal; and providing a corrected baseband version of the received radio frequency signal based on the baseband version of the received radio frequency signal and the error correction signal.

2. The method as recited in claim 1 wherein in a training mode of operation of the receiver, the expected transmitted data signal includes predetermined samples of an Access Address field of a Bluetooth Low Energy packet.

3. The method as recited in claim 1 further comprising:

generating the expected transmitted data signal based on the corrected baseband version of the received radio frequency signal and predetermined quantized values.

4. The method as recited in claim 1 wherein generating the error correction signal comprises:

generating a phase difference signal based on the phase of the error signal and the predicted instantaneous phase signal; and combining a proportional version of the phase difference signal with an integrated version of the phase difference signal to generate a predicted frequency signal.

5. The method as recited in claim 4 wherein generating the error correction signal further comprises:

integrating the predicted frequency signal to generate the predicted instantaneous phase signal.

6. The method as recited in claim 1 further comprising:

generating the phase of the error signal by converting the error signal from Cartesian coordinates to polar coordinates.

7. The method as recited in claim 1 wherein providing the corrected baseband version of the received radio frequency signal includes converting the error correction signal from polar coordinates to Cartesian coordinates.

8. The method as recited in claim 1 wherein the received radio frequency signal includes data modulated using quadrature amplitude modulation or phase-shift keying.

9. A wireless communications device comprising:

a receiver front-end circuit configured to provide a baseband version of a received radio frequency signal; and a demodulator comprising:

a phase detector configured to provide an error signal generated based on the baseband version of the received radio frequency signal and an expected transmitted data signal;

a phase-locked loop configured to generate an error correction signal based on a phase of the error signal and a predicted instantaneous phase of the error signal; and a correction circuit configured to provide a corrected baseband version of the received radio frequency signal based on the baseband version of the received radio frequency signal and the error correction signal.

10. The wireless communications device as recited in claim 9 wherein the phase detector comprises:

a select circuit configured to provide the expected transmitted data signal selected based on a mode of operation of the wireless communications device.

11. The wireless communications device as recited in claim 10 wherein the select circuit provides an output symbol of a hard decision circuit in response to the mode of operation being a tracking mode of operation.

12. The wireless communications device as recited in claim 10 wherein the select circuit provides a predetermined symbol in response to the mode of operation being a training mode of operation.

13. The wireless communications device as recited in claim 9 wherein the phase-locked loop comprises:

a phase difference circuit configured to generate a phase error signal based on a phase of the error signal and the predicted instantaneous phase of the error signal;

a proportional integral time-invariant controller responsive to the phase error signal; and an integrator configured to generate the predicted instantaneous phase of the error signal based on an output of the proportional integral time-invariant controller.

14. The wireless communications device as recited in claim 9 further comprising:

a converter circuit configured to convert the error signal from Cartesian coordinates to polar coordinates including the phase of the error signal, wherein the correction circuit includes a second converter circuit configured to convert the error correction signal from polar coordinates to Cartesian coordinates.

15. The wireless communications device as recited in claim 12 wherein the predetermined symbol is a symbol of an Access Address field of a Bluetooth Low Energy packet.

16. The wireless communications device as recited in claim 10 wherein the received radio frequency signal includes a data symbol transmitted using quadrature amplitude modulation or phase-shift keying modulation.

17. The method as recited in claim 1 further comprising:

training a Kalman filter based phase-locked loop using an Access Address field of a Bluetooth Low Energy packet of the baseband version of the received radio frequency signal in a first mode of operating the receiver;

tracking the frequency and phase offset of the received radio frequency signal using the Kalman filter based phase-locked loop in a second mode of operating the receiver; and wherein providing the corrected baseband version of the received radio frequency signal includes correcting the baseband version of the received radio frequency signal using the error correction signal, wherein the error correction signal is based on an estimate of the frequency and phase offset generated by the Kalman filter based phase-locked loop.

18. The method as recited in claim 17 wherein the Bluetooth Low Energy packet is transmitted using quadrature amplitude modulation or phase-shift keying modulation.

19. The method as recited in claim 17 wherein the training comprises:

the computing the error signal wherein in the first mode of operating the receiver, the expected transmitted data signal includes samples of the Access Address field of the Bluetooth Low Energy packet of the received radio frequency signal.

20. The method as recited in claim 17 wherein the tracking comprises:

computing the estimate of the frequency and phase offset based on the baseband version of the received radio frequency signal and the corrected baseband version of the received radio frequency signal.

* * * * *